March 13, 1945. J. T. LINDSEY 2,371,572
SAW SHARPENING MACHINE
Filed Jan. 23, 1941 5 Sheets-Sheet 3

INVENTOR.
Joseph T. Lindsey
BY Frank Keifer
ATTORNEY.

March 13, 1945. J. T. LINDSEY 2,371,572
SAW SHARPENING MACHINE
Filed Jan. 23, 1941 5 Sheets-Sheet 5

Fig-17

INVENTOR.
Joseph T. Lindsey
BY

ATTORNEY.

Patented Mar. 13, 1945

2,371,572

UNITED STATES PATENT OFFICE 2,371,572

SAW SHARPENING MACHINE

Joseph T. Lindsey, Rochester, N. Y.

Application January 23, 1941, Serial No. 375,566

17 Claims. (Cl. 76—41)

In machine shops and manufacturing plants it is common practice to carry bars of machine steel and tool steel, and bars of other materials, of various lengths and cross sections, and from time to time saw off from the end thereof a piece that is large enough for the particular work in hand. This sawing operation is done usually by a power driven hack saw. The blades of these hack saws ordinarily run from 12 to 24 inches in length and from one to two inches in width.

Heretofore the life of these hack saw blades has been rather short, because the teeth get dull, and then the teeth must be reground to sharpen them. Machines have been devised for sharpening the teeth of these hack saws, but because they are of doubtful success most of the hack saw blades do not have their teeth resharpened, but the blades are thrown away when the teeth first become dull.

With the machine which forms the subject matter of this invention, the teeth of hack saw blades can be sharpened three or even four times, or as long as enough of the original set is left in the teeth of the saw blade to still make it serviceable for cutting. If the saw blade is of material that is so hard that the teeth will break if any attempt is made to change the set thereof, the original set will limit the life of the blade, but if the teeth can be set further the sharpenings can be carried on indefinitely. In saw blades in which the set can be added to or increased, the sharpening can be carried on as much as the width of the saw blade will permit.

One of the objects of this invention is to provide a machine in which the axis of the grinding wheel will be placed immediately over the teeth of the saw.

Another object of the invention is to provide a machine in which the axis of the grinding wheel is in the same plane with the plane of the saw blade.

Another object of the invention is to place the grinding wheel with relation to the saw blade so that it will cut the teeth of the saw blade squarely across in exactly the same way during the whole life of the grinding wheel, as the grinding wheel wears down from a large diameter to a small diameter.

Another object of the invention is to provide a machine in which the grinding wheel is carried on a carriage that moves up and down in fixed guides with a straight line motion, said guides being tilted at an angle of less than 90 degrees to the line of the teeth of the saw blade.

Another object of the invention is to provide a machine in which the axis on which the grinding wheel turns moves up and down in the plane that is in line with the plane of the saw blade, said grinding wheel being carried on a carriage that moves up and down in fixed guides with a straight line motion.

Another object of the invention is to provide a clamp for the saw blade, and an elevator for the saw blade, that are adjusted up and down together.

Another object of the invention is to provide a feed for the saw blade that is carried on the jaws that clamp the saw blade and moves up and down with the jaws.

Another object of the invention is to support the blade of the saw that is being sharpened with a bow spring that will yield as the grinding wheel makes contact with the teeth of the saw, thereby lengthening the time of contact between the grinding wheel and the teeth of the saw, grinding the teeth being spread over a longer period of time with less heating-up effect and with less noise and permitting the grinding of more teeth per minute.

Another object of the invention is to use a grinding wheel with a grinding edge or surface that fits the contour between the tips of two consecutive teeth being ground.

Another object of the invention is to hold the saw blade stationary against endwise movement while the grinding is being done.

Another object of the invention is to move the grinding wheel up and down positively in both directions, an eccentric and a lever of the third class being used for this purpose, the lever being connected to links at each end thereof.

Another object of the invention is to drive the cross head that carries the grinding wheel up and down with the same shaft that positively drives the feed fingers, the cross head being driven from the intermediate part of the shaft and the feed fingers being driven from the end of the shaft, the feed fingers operating to advance the saw blade only after the grinding wheel has been raised clear of the saw blade, in other words, the saw blade remaining stationary during the grinding operation.

Another object is to provide means by which the grinding surface of the wheel may be dressed while the wheel is in place for use in the grinding operation.

Another object is to provide the machine with a dressing table that moves up and down with a grinding wheel on which table the dressing tool can be held at the proper angle to dress the grinding wheel as it rotates and moves up and down.

These and other objects of the invention will be illustrated in the drawings, described in the specification, and pointed out in the claims at the end thereof.

In the drawings.

In the drawings like reference numerals indicate like parts.

In the drawings reference numeral 1 indicates the base of the machine having the flange 2. At one corner of this base is fastened the electric motor 3. A gear housing 4 is fastened to this base by the bolts 5. This gear housing supports a short shaft, not shown, on the end of which is carried a boss 6 which is formed with a tongue so that it engages in and couples with the groove in the boss 7 carried on the shaft 8, driven by the electric motor 3. In this way the electric motor gives a direct drive to the boss 6 and the shaft on which it is carried, and also gives a direct drive to the pulley 9 carried on the shaft 8. The shaft on which the boss 6 is carried carries a worm which engages with the gear carried on the shaft 10, by which the shaft 10 is driven with a reduced angular velocity of about one to 24.

The forward end of the shaft 10 is supported by a boss 11 supported on a bracket 12, which bracket is bolted to the base of the machine. 13 indicates a stationary upright bracket fastened to the base of the machine by the bolts 14, 14. The bottom part of this bracket is upright. Integral therewith, however, are the guides 15 and 16, which are tilted to one side at an angle of 12 degrees to the upright member 13 of the bracket. On the guide 16 is carried the gib 17. Both of the guides 15 and 16 are undercut as shown at 18 and 19 in Figure 3, and in these guides travels up and down a crosshead 20, which crosshead is raised and lowered by a link 21 attached to the bottom thereof, which link is moved up and down by a lever 22 of the third class, the intermediate part of which carries a bearing 23 that engages with a crank or eccentric 24 carried on the shaft 10, so that the rotation of the shaft causes the bearing 23 to gyrate. The outer end of the lever 22 is provided with a bearing 25, which acts as a fulcrum for the lever, which bearing is mounted on the upper end of the link 26, the lower end of which link is pivotally mounted at 27 to a fixed bracket 28 that is rigidly fastened to the base 1 by the bolts or screws 29. This crosshead has an up and down travel of about five-eighths of an inch, caused by the rotation of the shaft 10, which with its crank moves the one end of the lever 22 up and down with the crosshead.

Extending out from the forward face of this crosshead, and integral therewith, is the bracket 30, which comprises a web 31 and the two flanges 32, 32 that are parallel to each other. On the forward ends of these flanges are provided the bosses 33, 33, in which is mounted to rotate the shaft 34 shown in Figure 10. On this shaft is carried a pulley 35, from which the pulley 9 is driven by a belt not shown.

By this mechanism the grinding wheel is moved positively up and down or in both directions and neither of the movements up or down is dependent upon gravity or a spring. This insures accuracy in the grinding.

Figure 3:
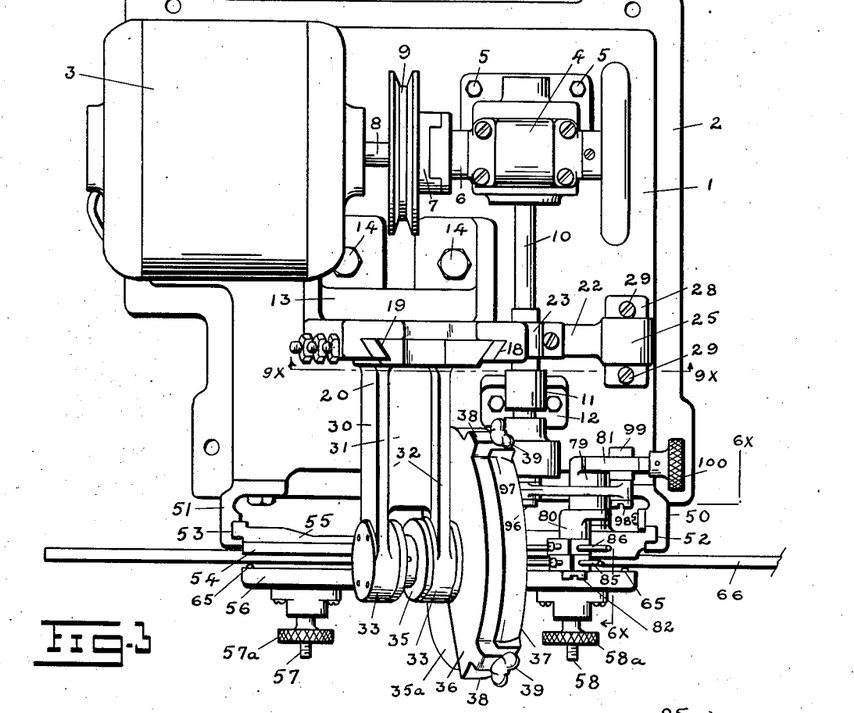
Figure 3 is a top plan view of the machine shown in Figure 1.

On the right hand end of this shaft 34 is carried the grinding wheel 35a, which is driven with the shaft with a high angular velocity. This grinding wheel is covered by a housing which is shown in Figure 3. This housing is divided into parts 36 and 37 that are clamped together. For this purpose, the part 36 carries brackets 38, 38, which have forked ends, which overhang the part 37 so that thumb screws 39 can pass through the forks and engage in bosses formed on the part 31, firmly clamping the two parts together. By taking off the part 37, the grinding wheel can be exposed and removed or changed from time to time.

The grinding wheel bears against a fixed washer or collar 40, and against the outside thereof is clamped a washer 41, which washer is thick inversely as the grinding wheel is thin, that is to say, if the grinding wheel is thick a thin washer would be used instead of a thick washer. The thickness of the grinding wheel is determined, to a considerable extent by the number of teeth on the saw blade to the inch, or by the distance between centers of the teeth, or the distance from point to point on the teeth; that is to say, if the teeth are close together, or many to the inch, a thin grinding wheel will be used and if the teeth are spaced further apart a thicker grinding wheel will be used.

The part 36 of the housing is fastened to the flange 32 by screws, not shown.

All grinding wheels used for grinding saw teeth on this machine must have their peripheries ground to an angle that conforms to the V shaped recess between two consecutive teeth. For this purpose, a diamond point and fixture therefor is used such as is shown in Figure 10.

Figure 5:
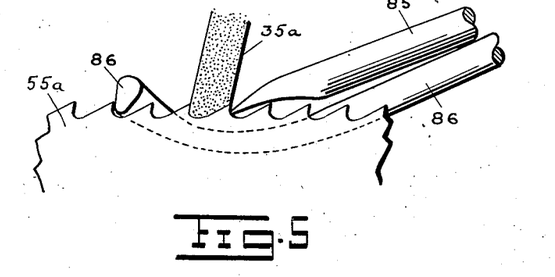
Figure 5 is an enlarged detail view of a portion of the hack saw blade, and the pawls for feeding the blade, and the grinding wheel in position for grinding the teeth.
Figures 10, 11, 12, 13, 14, 15:
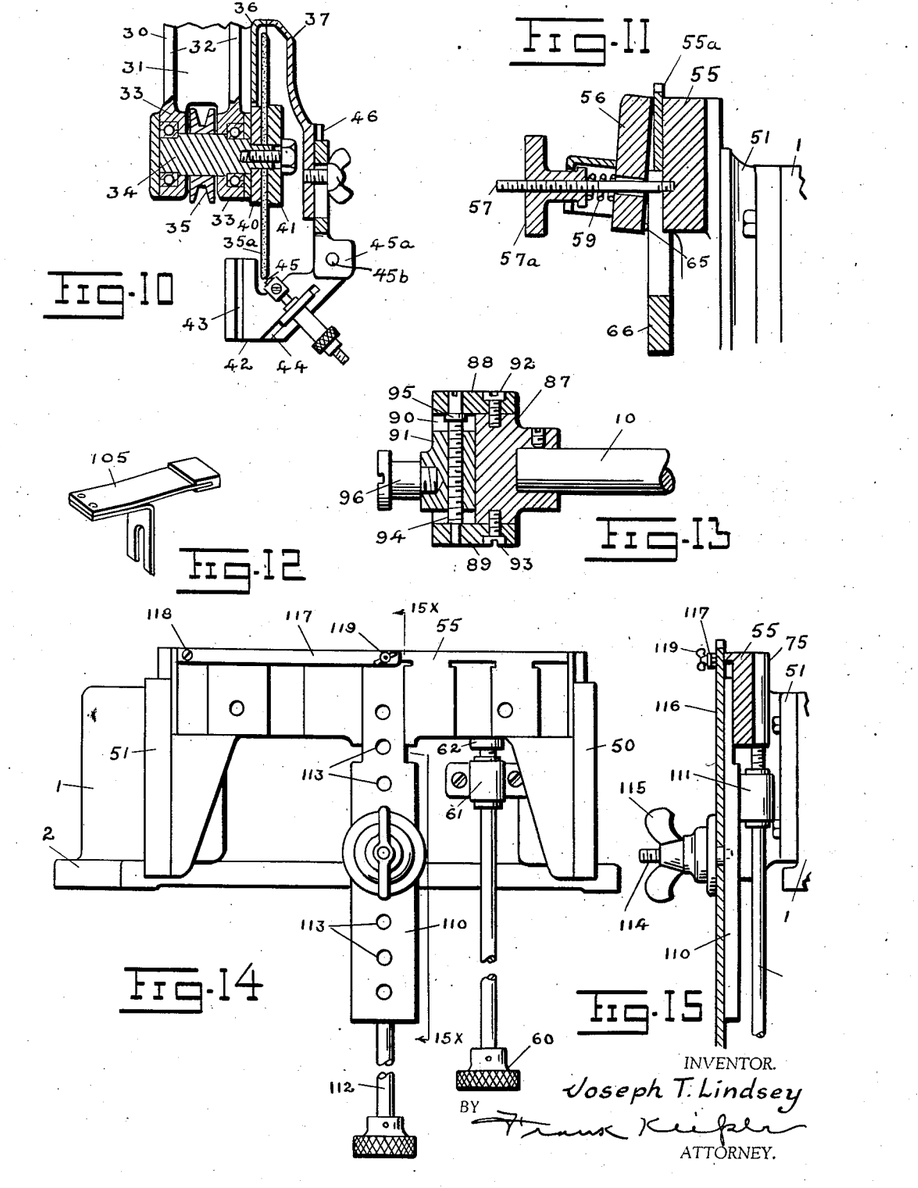
Figure 10 is a section on the line 10x—10x of Figure 1, showing the grinding wheel and the bearing therefor, and the bracket that carries the diamond for dressing the periphery of the grinding wheel.
Figure 11 is an enlarged section on the line 11x—11x of Figure 1, showing the jaws by which the saw blade is held in place.
Figure 12 is a perspective view of the bracket shown in Figure 1 that extends over the saw and holds it down.
Figure 13 shows an enlarged section on the line 13x—13x of Figure 7.
Figure 14 shows an attachment to this machine, by which a circular saw can be supported under the grinding wheel for the purpose of grinding the teeth of the saw, which attachment will support saws having a great variety of diameters.
Figure 15 shows a section on the line 15x—15x of Figure 14, the saw being shown in section on this figure but being omitted from Figure 14.

In Figure 10 I have shown a bracket or table 42 having a groove 43 and a groove 44 formed therein. In one or the other of these grooves is supported the fixture for the diamond point 45, by which the side or the periphery of the grinding wheel is dressed. In the groove 43 is carried the fixture that supports the diamond point that is used for the purpose of dressing the side of the emery wheel, and in the groove 44 is placed the fixture that carries the diamond point when it is used for dressing the periphery of the grinding wheel. While these grooves are shown one parallel to the face of the wheel and the other at an angle of 45 degrees thereto, it will be understood that the angles of these grooves can be changed to secure any desired shape to the periphery of the grinding wheel. That is to say, to shape that part of the grinding wheel that engages between two consecutive teeth, as is shown in Figure 5, giving the desired shape to the teeth. The diamond point is adjustable on this bracket forward and back and to a different angle, as is desired, and this makes it possible to dress the grinding wheel so as to keep the periphery of it in proper shape.

The bracket 42 is carried on an arm 45a, which is adjustable forward and back on the guide 46, this adjustment being necessary for wheels of different diameters.

Figure 1:
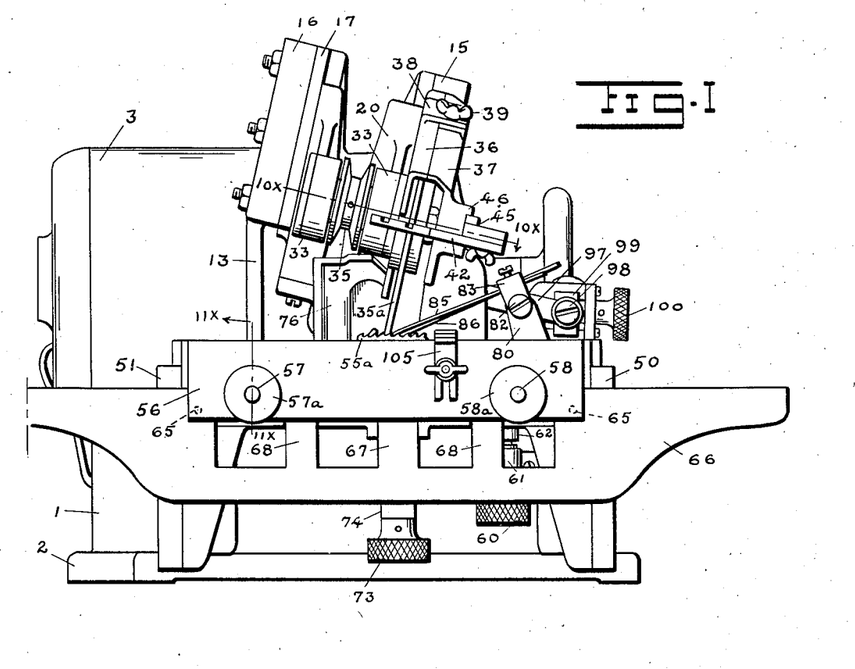
Figure 1 is a front elevation of the machine.

This bracket 42 is mounted on a stud 45b carried on the arm 45a as shown in Figure 10 and is clamped thereon by a thumb nut shown in Figure 1. The whole assembly of the arm 45a and the bracket 42 is carried on the part 31 of the housing which partially covers the grinding wheel and moves up and down with the grinding wheel. The assembly extends out substantially at right angles to the crosshead. The bracket 42 extends out beyond the grinding wheel and the diamond point 45 and its fixture extends inwardly therefrom toward the grinding wheel. The diamond point 45 carried by the bracket 42 contacts with the grinding wheel about 90° away from the point where the grinding wheel contacts with the teeth of the saw, and it moves up and down with the grinding wheel so that the grinding wheel does not have to be removed from its arbor to be dressed, but can be dressed by the diamond point while it is rotating and moving up and down with its arbor. In this way it can be accurately ground to fit the contour of the teeth of the saw.

It will also be understood that by releasing the thumb nut shown in Figure 1 the plate 42 can be released and be replaced with another plate having grooves at a different angle from those shown in Figure 10 so that the diamond tool will be held in the desired position while being moved back and forth to dress the periphery of the grinding wheel to the desired shape.

With this arrangement I can start grinding saws with a wheel 6" in diameter and as the wheel wears away I can repeatedly true the periphery of the wheel until the wheel gets down to 4" in diameter, maintaining the same shape on the periphery of the grinding wheel at all times. For that purpose I adjust the bracket 42 and the arm 45a out on the guide 46 and as the wheel wears down I adjust the arm 45a inwardly step by step to bring the diamond point to the correct position corresponding to the decreased diameter on the grinding wheel.

On the front of the base is fastened two upright brackets 50 and 51. These brackets each have a guide thereon 52 and 53. Mounted to travel up and down in these guides is the clamp 54, which comprises the rear jaw 55 and the front jaw 56. The front jaw is attached to the rear jaw by means of the clamping screws 57, 58.

On the screws outside of the jaw 56 are the helical springs 59, which are compressed by the turning of the heads 57a and 58a which compress the springs and force the outer jaw 56 against the inner jaw 55 with a yielding pressure. The saw blade 55a is held between these two jaws with this yielding pressure. This assembly of the two jaws 55 and 56 is adjustable up and down in the guides 52 and 53 through about 1¼ inches by means of the adjusting screw 60. The screw 60 turns freely in the bracket 61 carried on the base 1, in which it is held against up and down movement and is threaded in a boss 62 carried on the back of the jaw 55, so that on the turning of the screw the boss and the two jaws are moved up and down together. Lugs 65 are provided on the bottom of the outer jaw, which bear against the elevator bar 66 and hold the jaws apart at the bottom, so that when the screw heads 57a and 58a are turned, the jaws will be drawn together at the top, throwing a yielding tension on the saw blade close to the teeth thereof.

Between the jaws 55 and 56 is mounted to rise and fall the elevator bar 66. This elevator bar has one wide finger 67 at the middle and two narrow fingers 68, one on each side thereof, with an open space on each side of each finger. Each of the front and back jaws are recessed, as indicated at 69 and 70, to provide space in which these fingers can loosely travel, it being understood that the fingers 68 nest loosely into these recesses in each of the jaws, and the finger 67 is machined so as to make a rather close fit with the recesses in which it engages.

On this elevator bar 66 rests the bottom edge of the saw blade. On the top of the middle finger is a bow spring 71, which holds the middle of the blade slightly above the elevator bar. This bow spring yields when the grinding wheel makes contact with the teeth, and cushions the blade so that the contact between the grinding wheel and the teeth is somewhat longer and is less abrupt, grinding the teeth in better shape and with less heating-up effect, and causing the machine to operate with less noise. The bow spring 71 flattens out against the top of the supporting finger of the elevator bar as the saw blade is pushed down by the grinding wheel and this brings the saw blade down against a fixed stop.

This bow spring preferably gives about 1/64 of an inch or about .015". If the grinding wheel takes off .001" from the saw blade it will be seen that the wheel makes contact with the saw blade 15 times longer than would be possible if the saw blade were rigidly supported, and the grinding wheel were moved down and up at the same rate or the same number of times per minute.

If the grinding wheel takes off .0015" the grinding wheels make contact with the saw blade ten times longer than would be possible if the saw blade were rigidly supported. In this way the time of actual contact between the grinding wheel and the saw is greatly lengthened and the teeth are ground more slowly and with less heating up effect and with less noise and the temper of the saw is not injured in the grinding operation and the whole area exposed between the tips of two consecutive teeth is ground at the same time.

The foregoing assumes that the grinding is done entirely on the down stroke of the wheel, but it is true that most of the grinding is done on the down stroke of the wheel over the entire contour and that some of the grinding is done on the up stroke as well, until the wheel leaves the saw. This doubles the time of contact between the grinding wheel and the saw blade with great benefit both to the wheel and to the saw blade, and makes it possible to move the grinding wheel up and down very rapidly; that is at the rate of 83 teeth per minute, a rate which would not be possible if the saw blade did not yield up and down with the grinding wheel.

When a saw blade is ground, the saw blade has to be held at an elevation that will hold the bottom of the teeth slightly above the upper edges of the jaws. This elevation of the saw blade is secured by the elevation of the elevator bar 66, which bar is elevated by the turning of the screw 72, which is provided with a knurled head 73. This screw is engaged with a boss 74 on the back of the elevator bar 66, with which the screw rises and falls. The screw is threaded into a boss 75 on the back of the inner jaw 55. As the screw turns the elevator bar is raised or lowered, until the desired clearance of the teeth of the saw blade above the jaws is obtained.

A round hole is provided in the top of the base, just back of the grinding wheel, and a hood 76 is placed around three sides of this hole, so that the dust caused by grinding is directed by the hood into the hole, through which it passes into any receptacle in the base.

Figure 7:
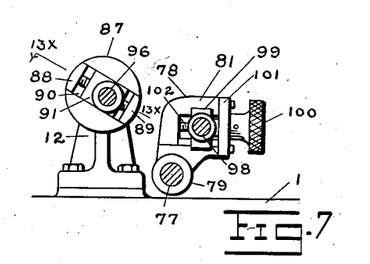
Figure 7 is a section on the line 7x—7x of Figure 6, showing the stud 77 on which the rocking arm 78 is mounted, the stud being shown in its lowest position corresponding to the position of the jaw 55 which must be set low when the grinding wheel is new and is therefore of large diameter.
Figure 8:
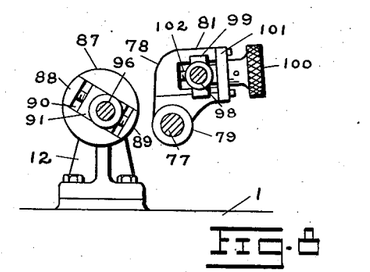
Figure 8 is a sectional view showing the same parts that are shown in Figure 7, but with the stud supporting the rocking arm in its highest position corresponding to the position of the bar 55 which must be raised up as the grinding wheel wears down to a smaller and smaller diameter.
Figure 9:
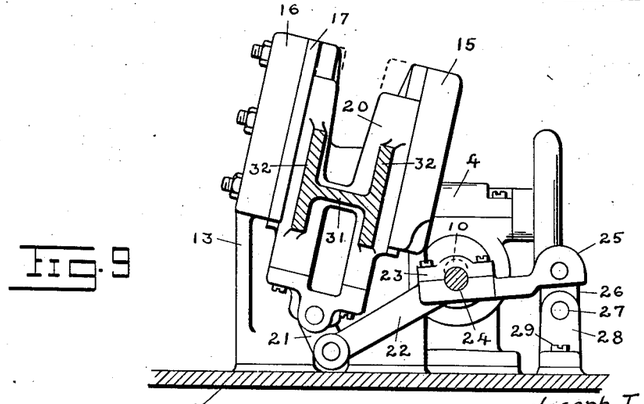
Figure 9 is a section on the line 9x—9x of Figure 3, showing the base, the stationary upright bracket with the bracket that slides thereon, which sliding bracket carries the bearing for the short shaft that supports and drives the emery wheel.
Figure 16:
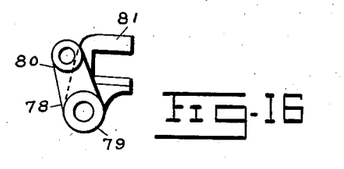
Figure 16 shows a detail of the rocker arm.
Figure 17:
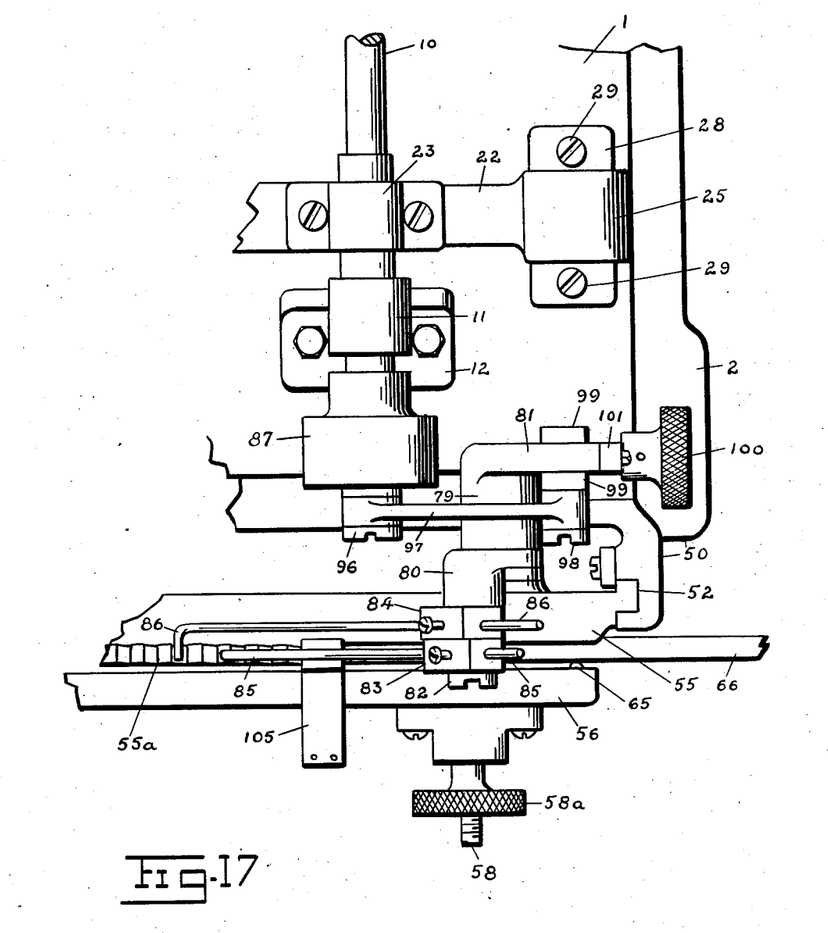
Figure 17 is an enlarged view of a portion of the machine shown in Figure 3, the grinding mechanism being omitted therefrom.

On the back of the jaw 55 is a stud 77 (see Figures 7 and 8.) On this stud is mounted the rocker arm 78, which comprises the hub 79 having the crank 80 on one end thereof and the bifurcated arm 81 on the other end thereof (see Figure 16). All of these parts are in one integral casting. The stud 77 and the parts carried thereon move up and down with the jaw 55, the jaw being fixed in its lowest position when the grinding wheel is new and is large in diameter and its position is raised as the grinding wheel wears down to a smaller and smaller diameter. It will also be understood that the axis of the grinding wheel moves up and down in a fixed path that never changes, the path being fixed by parts that are shown in Figure 9, the adjustment up and down being confined to the jaws and the elevator bar.

As the jaw 55 and stud 77 move up from the position shown in Figure 7 to the position shown in Figure 8, the stud 98 and the link 97 that connects it to the stud 96 swing around the stud 96 as will presently be described.

Figure 6:
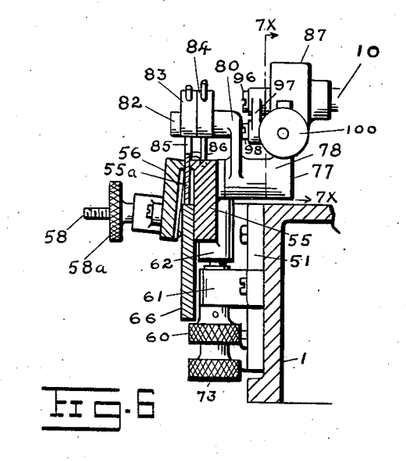
Figure 6 is a sectional view on the line 6x—6x of Figure 3, showing the frame of the machine and the adjustment of the elevator on which the bottom of the saw blade rests, which elevator is adjusted with reference to the width of the saw blade to be ground. It also shows the jaws between which the saw blade is clamped, and the stud which carries the arm which causes the pawls to feed the saw blade, and the up and down adjustment of the elevator for the saw, which adjustment must be made with reference to the diameter of the grinding wheel.

A stud 82 is threaded into the arm 80 (see Figure 6), and on this stud is carried the two pawl blocks 83 and 84. One of these pawl blocks carries the pawl 85, and the other block carries the pawl 86. These pawls engage with the teeth of the saw blade and advance the saw blade by a step by step motion performed wholly between grinding operations. The length of the advance in each case is the distance between the centers of the teeth or distance from point to point of the teeth. This rocker arm takes its motion from the shaft 10 by the train of mechanism that will now be described.

On the end of the shaft 10 is a large hub 87 that rotates continuously with the shaft. This hub is machined out to receive the blocks 88, 89 at places diametrically opposite each other. The forward end of the hub is machined to form a groove 90 across the face of it, in which slides the block 91. The blocks 88 and 89 are fastened to the hub by the screws 92 and 93 (see Figure 13). In the blocks 88 and 89 is mounted to rotate freely the screw 94. The screw 94 is threaded into the block 91, and causes the block 91 to travel up or down in the groove 90. A collar 95 is made integral with the screw 94 and forms a thrust bearing for the screw. On the block 91 is carried a crank pin 96 (see Figures 6, 7, 8 and 13). If the block 91 is adjusted so that the axis of the crank pin 96 is in line with the axis of the shaft 10, no lateral movement of the crank pin 96 will occur, but if the block 91 is adjusted so as to move the axis of the crank pin 96 out of line with the axis of the shaft 10, then the axis of the crank pin 96 will move through a circle. On the crank pin 96 swings one end of a link or connecting rod 97 (see Figure 3). The other end of this connecting rod engages with the crank pin 98 carried on a block 99, which is adjustable forward and back in the bifurcated arm 81. For this purpose a screw 100 is swiveled in a block 101. The threaded end of the screw 102 is threaded into the block 99, and by turning the screw head 100, the block 99 is adjusted forward and back.

The adjustment of the stud 96 away from the center of the hub 87 and away from the center of the shaft 10 on which it is carried is shown in Figures 7, 8 and 13. This adjustment determines the length of the stroke of the pawls 85 and 86. The stud 98 is held at a fixed distance from the stud 96 by the rigid link 97. The stud 98 swings up with its end of the link 97 around the stud 96 as the jaw 55 is moved up from the low position to the high position or in other words from the position of the stud 77 indicated in Figure 7 to the position indicated in Figure 8. This is because the stud 77 is mounted on the jaw 55 and the rocker arm 80 and 81 swings on the stud 77. When the jaw 55 is lowered the stud 98 swings from the position indicated in Figure 8 to the position indicated in Figure 7. The adjustment of the combination rocker arm and crank 80 and 81 with reference to the stud 98 and 96 determines the starting or stopping point of the pawls, which in every case must bring the fresh surface between the tips of two consecutive teeth of the saw exactly below the grinding wheel and leave it there during the grinding operation.

It shall also be understood that while the feed fingers 85 and 86 move forward and back continuously the parts are timed so that they move forward and carry the saw blade forward with it only when the grinding wheel is out of contact with the saw and during part of the backward movement the grinding wheel is in contact with the saw.

The adjustment of the parts to feed the saw will be described as follows:

We will assume that the machine is to be used to grind the teeth of a saw in which the points of the teeth are spaced a quarter of an inch apart. The saw will first be placed between the jaws, and the elevator will be adjusted to the correct height, and the jaws will be brought together so as to exert the correct pressure on the saw blade. Up to this point the assembly of the jaws and elevator must hold the saw out of contact with the grinding wheel when the grinding wheel is in its lowest position. Then the crank pin 96 will be adjusted so that it will travel through a circle whose diameter is a quarter of an inch, plus about a sixteenth of an inch that must be allowed for clearance. In other words, it will travel through a circle whose diameter is about $\frac{5}{16}$ of an inch. The two pawls are then engaged with the teeth of the saw substantially as is shown in Figure 5, and to get the pawls in this position the block 99 is adjusted forward or back in the bifurcated arm 81 by turning the screw head 100. While this adjustment is being made, the block remains stationary but the arms 81 and 80 swing, carrying the pawls either forward or back until they get in correct position. The pawls must bring the saw into the correct position, so that when the grinding wheel descends it will make correct contact with the face of one tooth and the top of the next tooth, it being understood that up to this point the saw is held out of reach of the grinding wheel.

Then the motor is started, and the assembly of the elevator bar and the clamps are then raised until the grinding wheel at its lowest point makes contact between the teeth, and any little adjustment that is then necessary to bring the teeth of the saw into the correct position with reference to the grinding wheel is made by turning the screw head 100. It is not practical to grind the teeth of the saw by passing the saw once through the machine, and it is therefore desirable to take a light cut with the grinding wheel on the teeth when the saw first goes through the machine, and to take a somewhat heavier cut the second and third time the saw goes through the machine. Even a fourth cut might be desirable to put the teeth in the best possible condition. Each time the saw blade is passed through the machine, the elevator and jaw assembly is raised one or more thousandths of an inch according to the condition of the saw blade.

When a new saw blade is inserted in the machine, the elevator and jaw assembly must be lowered before inserting the saw blade, and after the saw blade is inserted then it is raised into its first contact with the grinding wheel, and if the saw blade is of the same size as the preceding blade, adjustment or change of the feed is ordinarily unnecessary. In this way the operation can be repeated indefinitely with little or no change in the adjustment, but when a saw is inserted having eight teeth to the inch, then the feed must be adjusted to correspond, and the pawls must travel in each case the distance from tooth to tooth, plus about 25% extra for clearance.

It will also be understood that when the jaws and the elevator bar are raised or lowered, the rocker arm 78, hub 79, crank 80, bifurcated arm 81, and one end of the connecting rod 97 move up and down with it, it being understood that these parts are not carried on the frame of the machine but are carried on the rear jaw of the clamp, and these parts have an up and down movement of as much as 1¼ inches for the purpose of compensating for the wear on the grinding wheel. On the outer jaw of the clamp I provide a bracket 105 (see Figure 12) which can be adjusted up or down. This bracket carries an arm extending rearwardly over the teeth of the saw blade going through the machine, and holds that end of the blade down. The rear end of the arm is armored with a piece of tool steel tempered and hardened, and the teeth of the saw make contact with this portion of the arm.

It will also be understood that if teeth are broken out here and there from a saw blade it is necessary to use both pawls, for when the space left by the broken tooth would be contacted by the pawl 85, the blade would not feed, and it must then be operated on by the pawl 86 to get the correct advancement. If all the teeth are present in the saw, the pawl 86 need not be used.

For the purpose of grinding the teeth of a band saw, the operation is substantially the same as in grinding the teeth of a hack saw, and this is also true in grinding the teeth of a circular saw, except that the outer jaw 56, and the elevator bar 66, and the studs 57 and 58 are removed, and the device shown in Figures 14 and 15 will be used instead.

Figure 4:
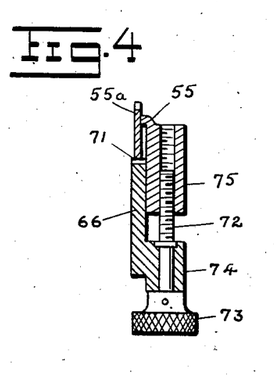
Figure 4 is a vertical section on the line 4x—4x of Figure 2, showing in section the elevator and the back jaw of the clamp for the saw blade.

In Figures 14 and 15 I have shown the elevator bar 110, which has a boss 111 on the back of it. The screw 112 is substituted for the screw 72 in Figure 4. This screw is swiveled in the boss 111 and is threaded into the boss 75, forming part of the inner jaw 55. The boss 111 is carried on the elevator bar 110. On this bar is a number of holes 113, etc. On the elevator bar 110 is carried a stud 114 at any suitable elevation by causing the stud to engage in one or the other of the holes 113. The bar itself is adjusted up or down by turning the screw 112. The thumb nut 115 is removed, and the circular saw 116 is engaged over the stud and held in place thereon by the thumb nut. On the back of the jaw 55 is carried the horizontal bar 117 held by a screw 118. On the right hand end of this bar is carried a thumb screw 119, which passes through the bar. The inner end of it bears against the saw 116 with sufficient friction to hold the saw steady.

Figure 2:
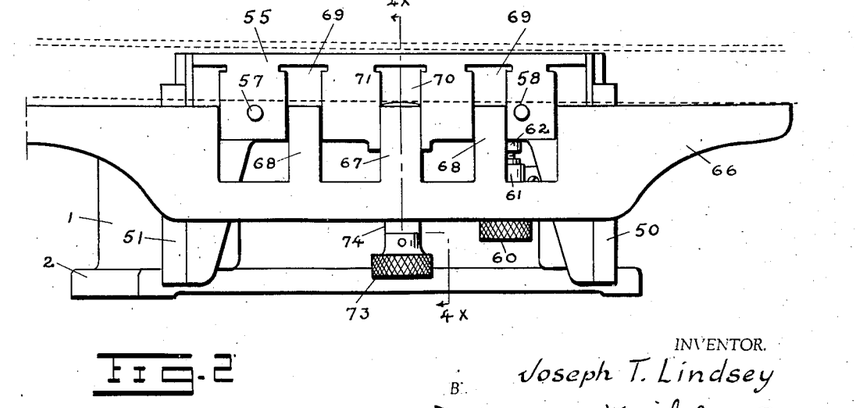
Figure 2 is a front elevation of the base of the machine and the elevator attached thereto that carries the saw blade.

In Figure 14 I have shown a screw 60 with a long stem instead of the short stem provided for this screw 60 in Figure 2. By turning the screw 60 the whole elevator assembly is moved up and down, as has been described above in connection with the use of the machine for grinding hack saw blades. The screw 112 is turned to adjust the elevator bar 110 up and down and place the periphery or teeth of the circular saw 116 at the correct elevation above the jaw 55.

I claim:
1. In a machine for grinding saws, means for clamping the saw in position with the teeth exposed, means for advancing the saw a tooth at a time, a wheel for grinding the back of one tooth and the front of the next tooth, means for raising the grinding wheel and its axis with a parallel movement, said means comprising a lever of the third class, a crank for gyrating the intermediate part of said lever in a complete circle, links connected to the ends of said lever permitting the intermediate part of the lever to gyrate, the rear end of said lever with the adjacent end of its supporting link swinging back and forth in the arc of a circle and the front end of said lever gyrating around a closed curve, said crank and lever and links positively moving said grinding wheel up and down.

2. In a machine for grinding saws, the combination of a stationary upright bracket, a crosshead mounted to travel in said bracket, a lever of the third class mounted to gyrate in its intermediate part, a link at one end connecting said lever to the crosshead, means to support the other end of said lever, said supporting means permitting it to travel in the arc of a circle, a shaft having a crank thereon engaged with the intermediate part of said lever to cause said intermediate part of the lever to positively gyrate around a closed curve, a crank on the end of said shaft, a link connected at one end to said crank, a rocker arm connected to the other end of said link, and means carried on said rocker arm to feed the saw one tooth at a time.

3. In a machine for grinding saws, the combination of a stationary upright bracket, a crosshead mounted to travel in said bracket, a lever of the third class mounted to gyrate in its intermediate part in a closed curve, a link at one end connecting said lever to the crosshead, means to support the other end of said lever, said supporting means permitting it to travel in the arc of a circle, a shaft having a crank thereon engaged with the intermediate part of said lever to cause said intermediate part of the lever to positively gyrate in a closed curve, said crank, lever and links causing said crosshead to positively move up and down, a crank on the end of said shaft, a link connected at one end to said crank, a rocker arm connected to the other end of said link, and means carried on said rocker arm to feed the saw one tooth at a time, brackets extending forward from the crosshead, a shaft mounted to rotate in said brackets, a grinding wheel and pulley mounted on and turning with said shaft.

4. In a saw grinding machine, a base, a grinding wheel adapted to move up and down thereon, and a pawl adapted to engage with and advance the saw blade after the grinding operation is completed, a power shaft for driving said parts, a large hub on the end of said shaft, a crank pin on the end of said hub adjustable radially across the hub, a link connected to said crank pin, a rocker arm connected to said link and rocked thereby, an adjustment on said rocker arm interposed between the arm and said link, a second arm integrally connected to the first arm and having a common bearing therewith, a pawl mounted on said second arm and reciprocated by said rocker arms, said pawl engaging with the teeth of the saw blade and advancing the saw blade in a step by step movement means for holding and supporting the saw blade in position, said rocker arms being pivoted on said supporting means.

5. In a machine for grinding saws, means for clamping the saw in position with the teeth exposed, means for advancing the saw a tooth at a time, a wheel for grinding the face of one tooth and the top of the next tooth on the down stroke, said wheel being carried on an axis that moves up and down above the saw blade, means for raising the grinding wheel and its axis up and down with a parallel movement, said means comprising a lever of the third class, a rotating crank for gyrating the intermediate part of said lever in a closed curve, a link connected to one end of said lever permitting that end of the link to swing back and forth in the arc of a circle, a link connected to the other end of the lever permitting that end of the lever to travel in a closed curve, a crosshead attached to said link and raised and lowered by said crank lever and links in a straight line permitting the intermediate part of the lever to gyrate.

6. In a machine for grinding the teeth of a saw a frame means for holding the saw in position, said means having a spring under the saw, a grinding wheel means for moving it up and down to make contact between two teeth of the saw and grind them, said spring permitting the saw to yield downwardly to a fixed stop with the grinding wheel during the grinding operation said spring raising the saw as the grinding wheel raises.

7. In a machine for grinding the teeth of a saw a frame means for holding the saw in position, said means having a spring under the saw, a grinding wheel means for moving it up and down to make contact between two teeth of the saw and grind them, said spring permitting the saw to yield downwardly to a fixed stop with the grinding wheel during the grinding operation and said spring raising the saw as the grinding wheel raises, a pawl for advancing the saw a tooth at a time between grinding operations and means for reciprocating the pawl, the saw being moved over the spring aforesaid.

8. In a machine for grinding the teeth of a saw a frame, means for holding the saw in position, said means having a spring under the saw, a grinding wheel means for moving it up and down to make contact between two teeth of the saw and grind them, said spring permitting the saw to yield downwardly to a fixed stop with the grinding wheel during the grinding operation, said spring raising the saw as the grinding wheel raises, a pawl for advancing the saw a tooth at a time, said pawl being supported on the saw holding means and means carried on the frame of the machine for operating said pawl.

9. In a machine for grinding the teeth of a saw a frame, means for holding the saw in position, said means having a spring under the saw, a grinding wheel means for moving it up and down to make contact between two teeth of the saw and grind them, said spring permitting the saw to yield downwardly to a fixed stop with the grinding wheel during the grinding operation, said spring raising the saw as the grinding wheel raises, a pawl for advancing the saw a tooth at a time, said pawl being supported on the saw holding means and means carried on the frame of the machine for operating said pawl, means for adjusting the saw holding means up and down on the frame of the machine without disturbing the means that operates the pawl.

10. In a saw grinding machine the combination of a machine frame of a cross head moving up and down, a lever of the third class, a rotating crank on which it is fulcrumed said crank rotating through a complete circle, a link pivoted to each end of the lever, the free end of one link being pivotally connected to the frame of the machine, the free end of the other link being pivotally connected to the cross head whereby on the rotation of the crank shaft, the lever and the cross head are moved up and down positively on the frame of the machine.

11. In a machine for grinding the teeth of a saw, means for holding the saw in position, a spring in said means under the saw that permits the saw to yield downwardly with the grinding wheel to a fixed stop and raises the saw as the wheel raises, a pawl for advancing the saw a tooth at a time between grinding operations, means for moving the pawl, a rotating grinding wheel, means for positively moving it up and down, said wheel operating on the down stroke to grind the entire contour of the saw between the tips of two consecutive teeth.

12. In a machine for grinding saws, the combination of a base, a clamp mounted on the front of the base, said clamp comprising a rear jaw and a front jaw, means for clamping said jaws together, an elevator bar between the bottom of the two jaws, a bow spring mounted centrally on the elevator bar and interposed between the elevator bar and the saw, a grinding wheel mounted to move up and down and into and out of contact with the saw blade, the saw blade and the bow spring being adapted to yield as the grinding wheel makes contact with the saw blade.

13. In a saw grinding machine, a base, a grinding wheel adapted to move up and down thereon, and a pawl adapted to engage with and advance the saw blade after the grinding operation is completed, a power shaft for driving said parts, a large hub on the end of said shaft, a crank pin on the end of said hub adjustable radially across the hub, a link connected to said crank pin, a rocker arm connected to said link and rocked thereby, an adjustment on said rocker arm interposed between the arm and said link, a second arm integrally connected to the first arm and having a common bearing therewith, a pawl mounted on said second arm and reciprocated by said rocker arms, said pawl engaging with the teeth of the saw blade and advancing the saw blade in a step by step movement, means for clamping and supporting the saw blade in position, said rocker arms being pivoted on said supporting means, an elevator bar which is adjustable up and down, a stud on said bar on which stud the rocker arms are supported and adapted to rock.

14. A machine for grinding saws, a combination of a stationary upright bracket, a crosshead mounted to travel up and down in said bracket, a lever of the third class, a crank rotating in a complete circle positively connected to said lever in its intermediate part and causing its intermediate part to gyrate in a closed curve, a link connecting the front end of said lever to the crosshead, a second link connecting the rear end of the lever to a stationary bracket on which the free end of the second link is pivoted, said cross head being positively moved up and down by said lever and crank and first named link.

15. A machine for grinding saws, a combination of a stationary upright bracket, a crosshead mounted to travel up and down in said bracket, a lever of the third class, a crank rotating in a complete circle positively connected to said lever in its intermediate part and causing its intermediate part to gyrate in a closed curve, a link connecting the front end of said lever to the crosshead, a second link connecting the rear end of the lever to a stationary bracket on which the free end of the second link is pivoted, the front end of said lever gyrating in a closed curve, the rear end of said lever moving back and forth in the arc of a circle, said crosshead being positively moved up and down by said lever and crank and first named link.

16. In a machine for grinding saws the combination of a stationary upright bracket, a crosshead mounted to travel in said bracket, a lever of the third class mounted to gyrate in its intermediate part around a closed curve, a rotating crank connected to said lever at its intermediate part, for positively gyrating the intermediate part of said lever around a closed curve, a link connecting the front end of said lever to the crosshead, a stationary bracket at the rear end of the lever, a second link pivoted on the stationary bracket at one end and connected at the other end to the lever, said crosshead being positively moved up and down by said lever and crank and first named link.

17. In a machine for grinding saws the combination of a stationary upright bracket, a crosshead mounted to travel up and down in said bracket, a lever of the third class mounted to gyrate a rotating crank for positively gyrating said lever in its intermediate part in a closed curve, a link at the forward end of the lever connecting said lever to the crosshead by which the crosshead is positively moved up and down, a link pivotally connected to the rear end of the lever by which the rear end of the lever is held to move in the arc of a circle.

JOSEPH T. LINDSEY.